3,370,956
FUMARIC ACID COMPOSITIONS

Paul D. Reitman, Brooklyn, and Edgar K. Hamilton, Merrick, N.Y., assignors to Chas. Pfizer & Co., Inc., New York, N.Y., a corporation of Delaware
No Drawing. Filed Aug. 20, 1963, Ser. No. 303,422
14 Claims. (Cl. 99—78)

This invention relates to an improved method for increasing the solubility rate of fumaric acid in water, especially cold water, and to the improved product of that method.

In the food industry, acidulants are employed in dry, water-soluble beverage mixes. Fumaric acid has many properties which make it desirable for commercial use in such products, but it does not dissolve rapidly in cold water. Whereas dry beverage mixes should desirably dissolve in cold water within a period of about two minutes or less, fumaric acid sometimes fails to dissolve completely even after 24 hours.

It is an object of this invention, therefore, to prepare a fumaric acid composition which has a high rate of solubility in cold water, i.e. in water at about 7° C.

In the past, various methods have been proposed for increasing the solubility rate of fumaric acid, viz., pulverizing the fumaric acid crystals alone or with certain long chain fatty acid esters. However, there are important disadvantages to these methods. Pulverized or very finely divided fumaric acid has a tendency to accumulate an electrostatic charge and to agglomerate, making handling and dispersal in water extremely difficult. Fumaric acid powder ground with certain long chain fatty acid esters has a tendency to foam when added to water. Furthermore, such fumaric acid compositions after standing for a few days may exhibit scum formation when added to water.

It has now been discovered that stable fumaric acid having a high rate of solubility in cold water may be obtained by treating fumaric acid crystals with a solution in such manner as to apparently prevent further crystal growth, and thereafter drying the acid. In essence, the process entails drying finely divided fumaric acid in contact with a water solution of a soluble, edible substance, the solution optionally containing a water-dispersible, edible, film-forming additive. This process may be effected, for example, by drying a slurry or suspension of finely divided fumaric acid in such medium. Alternatively, the aqueous solution may be introduced by spraying into a fluidized bed of the fumaric acid, and drying effected within the fluidized bed by means of a stream of heated air. While other solvents may be employed, water will ordinarily be preferred for economy and convenience.

The suspension or slurry is maintained under such conditions as to substantially preserve the identity of the fumaric acid crystals. It is to be noted, however, that some agglomeration of the product may occasionally occur, depending upon the mode of drying. The individual fumaric acid crystals, however, substantially retain their identity with respect to particle size, and any agglomerates readily break down on screening.

The fumaric acid to be treated in accordance with the new process should consist essentially of particles whose diameter, i.e. minimum dimension, is below about 20 microns, and preferably below about 10 microns. Fumaric acid ordinarily occurs in acicular or rod-like crystals even after milling or grinding, under which circumstances it will be appreciated that the particle length is not critical, the crystal diameter or minimum dimension being critical for the present purpose.

In one embodiment of the invention, the finely divided fumaric acid is mixed with an edible, water-soluble substance, hereinafter referred to as Component A, selected from the group consisting of hydroxycarboxylic acids of from about two to twelve carbon atoms, such as citric acid, tartaric acid, malic acid, lactic acid, and their edible, water-soluble metal salts; aminocarboxylic acids of from about two to twelve carbon atoms, such as glutamic acid, lysine, and their edible, water-soluble acid addition and metal salts; and water-soluble salts, such as the chloride, sulfate, acetate and phosphate, of sodium, potassium and ammonium. The mixture is added to enough water to make a slurry, and the slurry is thereafter dried.

Particularly preferred edible, water-soluble metal salts include the sodium and potassium salts; preferred edible, water-soluble acid addition salts include hydrochlorides, phosphates, sulfates, and acetates.

The concentration of Component A used is preferably between about 25% and 75% by weight, based on total solids. Concentrations above 75% are also effective but there is ordinarily no added advantage to the use of such high levels. A preferred level is about 50%. The amount of water used is not critical. Enough, of course, should be used so that the mixture can be effectively mixed and pumped, and not so much as to dissolve the fumaric acid (but this would require over 300 ml. per gram). The slurry is generally made up at ambient temperature.

Variations in the described process may be made without departing from the scope of the invention. For example, an aqueous solution of Component A may be prepared and the finely divided fumaric acid then added to form the slurry. Also, two or more members of the group constituting Component A may be employed in combination. Drying of the slurry may be effected by any of a variety of means, including spray drying, vacuum drum drying, vacuum rotary drying, vacuum shelf drying and the like. A preferred method is spray drying.

A further valuable embodiment of the instant invention involves the addition along with Component A of a water-dispersible, edible, film-forming material, hereinafter referred to as Component B, selected from the group consisting of carbohydrates, such as methyl cellulose, carboxymethyl cellulose, pectin, invert sugar, lactose, tapioca starches, gum guar, gum tragacanth, gum acacia, and agar-agar; water-soluble gelatins, such as 50 Bloom edible gelatin (T. M. Duche & Sons, Inc.) and Keystone Edible Gelatin No. 56 (American Agricultural Chemicals); surfactants, such as partial long chain fatty acid esters of polyoxyethylene derivatives of hexitol anhydrides, e.g. polyoxyethylene sorbitan stearate and polyoxyethylene sorbitan monooleate; polyvinyl pyrrolidone; and dioctylsulfosuccinic acid and its edible, water-soluble salts.

In the preferred embodiment, Components A and B are generally combined and dissolved in water. To this solution is added the finely divided fumaric acid to form a slurry or suspension, and the slurry is thereafter dried. Effective amounts of Component B range from about 0.001% to about 0.7% by weight, based on total solids (i.e. including the fumaric acid weight). Generally, as the amount of Component B increases, the required amount of Component A decreases, and concentrations of Component A as low as 1% are effective in the presence of Component B. Although the level of Component A may be as high as about 75% or higher, when used in combination with Component B amounts in the range of about 1% to 20% are preferred. No advantage is gained by using Component B at levels greater than about 0.7%. In fact, Component B is generally hygroscopic, and larger amounts will tend to lower the shelf life of the fumaric acid composition. The various substances comprising Component B may be used singly or in combination with each other.

The temperature and the residence time at which the slurry or suspension is best dried are related, and will vary with the method of drying and the nature of the drying equipment. The residence time is defined as the time the slurry or suspension is in contact with the heat. For example, for a spray dryer inlet gas temperature of 500° F. and an outlet gas temperature of 200° F., a residence time of 15 to 30 seconds is quite satisfactory. For best results, the temperature should be such that the fumaric acid crystals are not permitted to grow in size during the drying process. Generally, exposure of the slurry to high temperatures for a short period of time will effect drying without causing growth of the crystals, apparently because the solvent is removed before the fumaric acid has dissolved to any appreciable extent. Suitable temperatures and residence times for the particular drying equipment can be readily determined experimentally.

The novel fumaric acid of this invention has many advantages which make it eminently suitable for use in beverage powders. It is readily soluble in cold water: 3.2 g. will dissolve in two quarts of 7° C. water in about 15 to 180 seconds. It produces substantially no foam when added to cold water, and there is a minimum of scum formation when the product is dissolved in water after prolonged storage. Because of the low concentrations of Components A and B used, there is substantially no off-flavor. There is substantially no tendency to accumulate a static charge, or to absorb moisture upon storage.

The following examples are provided for illustrative purposes and should not be construed as limiting the invention, the scope of which is defined by the appended claims.

EXAMPLE I

Micronized fumaric acid (255 g.) is added to 250 ml. of aqueous solution containing 45 g. citric acid and 0.5 g. polyvinyl pyrrolidone. The resultant slurry, after being mixed well, is fed at the rate of 50 ml./min. into a Bowen Laboratory Model Spray Dryer which has an inlet gas temperature of 500° C. and an outlet gas temperature of 200° F. The dried product is collected and screened through a 170 U.S. Standard mesh. When added to cold water, the product rapidly dissolves.

EXAMPLE II

Micronized fumaric acid (882 g.) is added to 3000 ml. of aqueous solution containing 18 g. citric acid and 1.5 g. dioctyl sodium sulfosuccinate. The resultant slurry is fed into a Bowen Laboratory Model Spray Dryer which has an inlet gas temperature of 550° F. and an outlet gas temperature of 225° F. The dried product is collected and screened through a 200 U.S. Standard mesh. When added to cold water, the product rapidly dissolves.

EXAMPLES III–XVI

| Ex. No. | Fumaric Acid (g.) | Component A Citric Acid (g.) | Component B (g.) |
| --- | --- | --- | --- |
| III | 765 | 135 | 0.45 dioctyl sodium sulfosuccinate; 1.5 polyvinyl pyrrolidone. |
| IV | 765 | 135 | 0.45 dioctyl sodium sulfosuccinate. |
| V | 765 | 135 | 1.5 Instant Jel,[1] 1.5 invert sugar. |
| VI | 765 | 135 | 2.25 Instant Jel; 2.25 Crystal Gum.[2] |
| VII | 855 | 45 | 2.1 dioctyl sodium sulfosuccinate. |
| VIII | 765 | 135 | 1.5 ammonium saccharin; 1.5 Crystal Gum. |
| IX | 765 | 135 | 4.5 Crystal Gum; 1.5 invert sugar. |
| X | 765 | 135 | 0.3 dioctyl sodium sulfosuccinate; 2.55 tapioca starch. |
| XI | 765 | 135 | 0.6 polyvinyl pyrrolidone; 0.15 dioctyl sodium sulfosuccinate. |
| XII | 765 | 135 | 0.45 dioctyl sodium sulfosuccinate; 1.5 methyl cellulose. |
| XIII | 765 | 135 | 0.45 dioctyl sodium sulfosuccinate; 2.25 Crystal Gum. |
| XIV | 765 | 135 | 0.15 dioctyl sodium sulfosuccinate; 2.25 invert sugar. |
| XV | 765 | 135 | 1.8 pectin; 1.8 methyl cellulose. |
| XVI | 765 | 135 | 1.2 polyvinyl pyrrolidone. |

[1] Pregelatinized starch made from tapioca (National Starch and Chemical Corp.).
[2] Modified tapioca dextrin (National Starch and Chemical Corp.).

In Examples III to XVI, Components A and B are dissolved in water. The solution is added to finely ground fumaric acid to make a homogeneous slurry of three liters total volume. The slurry is pumped to a spray dryer maintained at an inlet gas temperature of from 300° F. to 575° F. and an outlet gas temperature of from 150° F. to 350° F. The dried product obtained in each case readily passes through a 120 U.S. Standard mesh, and when used in a dry beverage mix formulation, the product rapidly dissolves in cold water.

EXAMPLES XVII–XXII

| Example No. | Fumaric Acid (g.) | Component A (g.) |
| --- | --- | --- |
| XVII | 500 | 500 tartaric acid. |
| XVIII | 500 | 530 citric acid. |
| XIX | 500 | 450 lactic acid. |
| XX | 500 | 500 lysine hydrochloride. |
| XXI | 500 | 500 ammonium chloride. |
| XXII | 500 | 600 sodium sulfate. |

In Examples XVII to XXII, Component A is dissolved in water. The solution is added to finely ground fumaric acid, and the total volume brought to 2500 ml. The resultant slurry is mixed until homogeneous, and the slurry is pumped to a spray dryer maintained at an inlet gas temperature of about 525° F. and an outlet gas temperature of about 200° F. The dried product obtained in each case readily passes through a 150 U.S. Standard mesh, and when used in a dry beverage mix formulation, the product readily dissolves in cold water.

EXAMPLE XXIII

The procedure of Example XVIII is followed except that the slurry is dried by vacuum drumdrying using atmospheric steam. Drum temperatures are 50° to 60° C. and contact time is about 30 to 60 seconds. The dried product, after screening through a 120 U.S. Standard mesh, dissolves rapidly when added to cold water.

EXAMPLE XXIV

The procedure of Example IV is followed except that Component A is glutamic acid hydrochloride. The dried product readily passes through a 120 U.S. Standard mesh and dissolves rapidly when added to cold water.

EXAMPLE XXV

The procedure of Example III is followed except that Component A is ammonium sulfate. The dried product readily passes through a 120 U.S. Standard mesh and dissolves rapidly when added to cold water.

EXAMPLE XXVI

The procedure of Example IV is followed except that Component B is polyoxyethylene sorbitan stearate. The dried product readily passes through a 120 U.S. Standard mesh and dissolves rapidly when added to cold water.

EXAMPLE XXVII

A fruit flavored beverage mix is made as follows: 3.2 g. of fumaric acid as prepared in Example II is mixed with 11 g. of a mixture containing F. D. & C. Yellow No. 6 certified food coloring 0.10–1.25 parts by weight, orange fruit flavor 0.25–1.75 parts by weight, and dextrose hydrate sufficient to bring the total parts by weight to 100. The mixture is dissolved in two quarts of cold water, and to this solution is added about 1.5 cups of sugar to prepare a fruit flavored beverage. The fruit flavored beverage mix goes into solution almost immediately without foaming.

What is claimed is:

1. Fumaric acid crystals of enhanced rate of water-solubility, consisting essentially of particles in acicular or rod-like form having a dimension below about 20 microns and surrounded by a dried deposit of a water-soluble, edible substance selected from the group consisting of hydroxycarboxylic acids of about 2 to 12 carbon atoms and their metal salts.

2. Fumaric acid crystals of enhanced rate of water-solubility, consisting essentially of particles in acicular or rod-like form having a dimension below about 20 microns and surrounded by a dried deposit of a water-soluble, edible substance selected from the group consisting of hydroxycarboxylic acids of about 2 to 12 carbon atoms and their metal salts, together with a water-dispersible, edible, film-forming material selected from the group consisting of dioctyl sulfosuccinate or a water-soluble salt thereof carbohydrates, gelatins, polyvinyl pyrrolidone, and partial long chain fatty acid esters of polyoxyethylene derivatives of hexitol anhydrides.

3. The product of claim 2 wherein the said edible substance is citric acid and the said film-forming material is dioctyl sulfosuccinate or a water-soluble salt thereof.

4. The method of preparing fumaric acid of enhanced rate of water-solubility which comprises forming a slurry of fumaric acid consisting essentially of crystals having a dimension below about 20 microns in an aqueous solution of a water-soluble edible substance selected from the group consisting of hydroxycarboxylic acids of about 2 to 12 carbon atoms and their metal salts; said substance being present in said solution in an amount equal to from about 25% to 75% by weight based on the total weight of said substance and of said fumaric acid; and thereafter drying said fumaric acid particles while in contact with said solution.

5. The method of claim 4 wherein said substance is citric acid.

6. The method of claim 4 wherein said substance is tartaric acid.

7. The method of preparing fumaric acid of enhanced rate of water-solubility which comprises forming a slurry of fumaric acid consisting essentially of crystals having a dimension below about 20 microns in an aqueous solution of a water-soluble edible substance selected from the group consisting of hydroxycarboxylic acids of about 2 to 12 carbon atoms and their metal salts; together with a water-dispersible, edible, film-forming material selected from the group consisting of dioctyl sulfosuccinate or a water-soluble salt thereof, carbohydrates, gelatins, polyvinyl pyrrolidone, and partial long chain fatty acid esters of polyoxyethylene derivatives of hexitol anhydrides; said edible substance being present in said solution in an amount equal to from about 1% to 75% by weight, and said film-forming material being present in the solution in an amount equal to from about 0.001% to 0.7% by weight, each based on the total weight of said fumaric acid, said substance and said material; and thereafter drying the slurry.

8. The method of claim 7 wherein the film-forming material is methyl cellulose.

9. The method of claim 7 wherein the film-forming material is pectin.

10. The method of claim 7 wherein the film-forming material is sodium dioctyl sulfosuccinate.

11. The method of preparing fumaric acid of enhanced rate of water-solubility which comprises forming a slurry of fumaric acid consisting essentially of crystals having a dimension below about 20 microns in an aqueous solution of lactic acid and of a water-dispersible, edible, film-forming material selected from the group consisting of dioctyl sulfosuccinate or a water-soluble salt thereof, carbohydrates, gelatins, polyvinyl pyrrolidone, and partial long chain fatty acid esters of polyoxyethylene derivatives of hexitol anhydrides; said lactic acid being present in said solution in an amount equal to from about 1% to 20% by weight of the total of fumaric acid, lactic acid, and film-forming material and said film-forming material being present in the solution in an amount equal to from about 0.001% to 0.7% by weight, also based on the total weight of the fumaric acid, the lactic acid and the film-forming material; and thereafter drying the slurry.

12. The method of claim 5 wherein the drying is accomplished by spray drying and said citric acid is present in an amount equal to about 50% by weight based on the total weight of the said citric and fumaric acids.

13. The method of preparing fumaric acid of enhanced rate of water-solubility which comprises forming a slurry of fumaric acid consisting essentially of crystals having a dimension below about 20 microns in an aqueous solution of citric acid and of a water-dispersible, edible, film-forming material selected from the group consisting of dioctyl sulfosuccinate or a water-soluble salt thereof, carbohydrates, gelatins, polyvinyl pyrrolidone, and partial long chain fatty acid esters of polyoxyethylene derivatives of hexitol anhydrides; said citric acid being present in said solution in an amount equal to from about 1% to 20% by weight of the total of fumaric acid, citric acid, and film-forming material and said film-forming material being present in the solution in an amount equal to from about 0.001% to 0.7% by weight, also based on the total weight of the fumaric acid, the citric acid and the film-forming material; and thereafter drying the slurry.

14. A method of preparing fumaric acid crystals of enhanced rate of water solubility which comprises:
(I) forming a slurry of fumaric acid consisting essentially of crystals having a dimension below about 20 microns in an aqueous solution of 2% by weight citric acid and 0.2% by weight sodium dioctyl sulfosuccinate based on the total weight;
(II) and thereafter spray drying said slurry.

References Cited

UNITED STATES PATENTS

| | | | |
|---|---|---|---|
| 2,399,085 | 4/1946 | Winslow | 252—363.5 |
| 3,009,810 | 11/1961 | Raffensperger | 99—78 |
| 3,011,894 | 12/1961 | Block | 99—78 |
| 3,016,299 | 1/1962 | Raffensperger | 99—78 |
| 3,089,818 | 5/1963 | Stone | 252—363.5 X |
| 3,151,986 | 10/1964 | Van Ness | 99—78 |
| 3,245,798 | 4/1966 | Van Ness | 99—78 |
| 3,169,872 | 2/1965 | Rau | 99—78 |

FOREIGN PATENTS 765,885   7/1954   Great Britain.

OTHER REFERENCES

West et al., Textbook of Biochemistry, 3rd edition, 1961, MacMillan Co., N.Y., p. 292.

A. LOUIS MONACELL, *Primary Examiner.*

M. VOET, *Assistant Examiner.*